United States Patent
Tashiro et al.

(10) Patent No.: US 11,472,482 B2
(45) Date of Patent: Oct. 18, 2022

(54) FRONT VEHICLE-BODY STRUCTURE OF VEHICLE

(71) Applicant: MAZDA MOTOR CORPORATION, Hiroshima (JP)

(72) Inventors: Kuniyoshi Tashiro, Aki-gun (JP); Shigeaki Watanabe, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 137 days.

(21) Appl. No.: 17/067,206

(22) Filed: Oct. 9, 2020

(65) Prior Publication Data

US 2021/0114666 A1 Apr. 22, 2021

(30) Foreign Application Priority Data

Oct. 17, 2019 (JP) .............................. JP2019-190471

(51) Int. Cl.
*B62D 21/15* (2006.01)
*B62D 21/02* (2006.01)
*B62D 21/11* (2006.01)

(52) U.S. Cl.
CPC ........... *B62D 21/152* (2013.01); *B62D 21/02* (2013.01); *B62D 21/11* (2013.01)

(58) Field of Classification Search
CPC ....... B62D 21/152; B62D 21/02; B62D 21/11
See application file for complete search history.

(56) References Cited

U.S. PATENT DOCUMENTS

| 5,466,033 A * | 11/1995 | Murakami | B62D 25/082 296/203.02 |
| 2016/0121934 A1* | 5/2016 | Murayama | B62D 21/152 296/187.09 |
| 2016/0362139 A1* | 12/2016 | Sekiguchi | B62D 25/082 |

FOREIGN PATENT DOCUMENTS

| DE | 112017000111 T5 * | 5/2018 | ........... B62D 21/152 |
| JP | 2008213562 A * | 9/2008 | |
| JP | 2009143393 A | 7/2009 | |

* cited by examiner

*Primary Examiner* — Lori L Lyjak
(74) *Attorney, Agent, or Firm* — Studebaker & Brackett PC

(57) ABSTRACT

A front vehicle-body structure of a vehicle that enables smooth compressive deformation of a front side frame from the front side thereof on a vehicle frontal collision portion. The front vehicle-body structure of a vehicle includes a pair of left and right front side frames extending in a vehicle front-rear direction is characterized in that each of the front side frames is formed such that a rear side portion has a higher rigidity than a front side portion, and rigidity differences are alternately formed in the vehicle front-rear direction in each of regions of the front side portion and the rear side portion.

10 Claims, 13 Drawing Sheets

FRONT VEHICLE-BODY STRUCTURE OF VEHICLE

BACKGROUND

Technical Field

The present disclosure relates to a front vehicle-body structure of a vehicle including a pair of left and right front side frames extending in the vehicle front-rear direction.

Background Art

Hitherto, a configuration that absorbs collision energy by compressively deforming front side frames in a bellows form along the longitudinal direction thereof at the time of a vehicle frontal collision has been known, and Japanese Patent Laid-Open No. 2009-143393 discloses a front vehicle-body structure of a vehicle as below.

At the time of a vehicle frontal collision, a front portion of the front side frame is compressively deformed (so-called axial compressive deformation) and crushed in the front-rear direction, and a rear portion of the front side frame is bent (so-called lateral breakage deformation) so as to protrude to the vehicle-width-direction outer side.

When the axial compressive deformation and the lateral breakage deformation are compared with each other, the axial compressive deformation can absorb a larger amount of collision energy with the same stroke. Therefore, when the collision energy is absorbed with a stroke shorter than normal because of reasons due to a longitudinal engine, for example, the energy is preferred to be absorbed only by the axial compressive deformation.

When compressive deformation is performed in the longitudinal direction of each of the front side frames, the following occurs when the length of the front side frame in the front-rear direction is long. When a midway portion of the front side frame in the front rear direction is crushed first, compressive deformation of a place ahead of the midway portion becomes difficult and the energy absorption efficiency is deteriorated. Therefore, the way of preventing the midway portion from being crushed first and causing a smooth compressive deformation from a front side portion across the entire longitudinal direction is important.

SUMMARY

Accordingly, the present disclosure provides a front vehicle-body structure of a vehicle capable of causing a smooth compressive deformation of a front side frame from the front side thereof at the time of a vehicle frontal collision.

A front vehicle-body structure of a vehicle according to the present disclosure is a front vehicle-body structure of a vehicle including a pair of left and right front side frames extending in a vehicle front-rear direction. In the front vehicle-body structure, each of the front side frames is formed to have a closed cross-section shape when seen from the vehicle front-rear direction and is formed such that a rear side portion has a higher rigidity than a front side portion, and rigidity differences are alternately formed in the vehicle front-rear direction in each of regions of the front side portion and the rear side portion.

According to the abovementioned configuration, the following effect is obtained. In other words, the rigidity differences are alternately formed in the vehicle front-rear direction in each of the regions of the front side portion and the rear side portion of the front side frame, and hence the compressive deformation starts from the front side portion of the front side frame of which rigidity is relatively low at the time of a vehicle frontal collision. Then, the rear side portion of the front side frame of which rigidity is relatively high is compressively deformed. Therefore, the front side frame can be compressively deformed in a smooth manner from the front side portion across the entire longitudinal direction.

In one embodiment of the present disclosure, the front side frame includes an outer wall surface portion and an inner wall surface portion. A recessed front-rear bead portion extending in the vehicle front-rear direction is included in each of the outer wall surface portion and the inner wall surface portion of the front side frame, an up-down-width enlarged portion in which an up-down width of the recessed front-rear bead portion is enlarged is formed in a position in the front side portion of the front side frame that is close to a front side. The up-down-width enlarged portion includes a low rigidity portion in which a recessed up-down bead portion, which is recessed to an inner side of the front side frame more than the recessed front-rear bead portion and which extends in an up-down direction, is formed, the low rigidity portion having a lowest rigidity in the regions of the front side portion and the rear side portion of the front side frame.

According to the abovementioned configuration, the recessed front-rear bead portions extending in the vehicle front-rear direction are formed in the outer wall surface portion and the inner wall surface portion of the front side frame, and hence ridges can be increased by the recessed front-rear bead portions, and the cross-sectional rigidity of the front side frame with respect to the vehicle front-rear direction can be improved.

The low rigidity portion is formed by the recessed up-down bead portion. Thus, when the front side frame is compressively deformed from the front side portion at the time of a vehicle frontal collision, the low rigidity portion obtained by the recessed up-down bead portion formed in a position therein close to the front side serves as the breaking starting point. Therefore, deformation from the middle of the front-rear direction of the front side portion of the front side frame is suppressed, and deformation from a position in the front side portion of the front side frame that is close to the front side becomes possible. Therefore, the front side frame can be compressively deformed from the front side in a reliable manner.

In one embodiment of the present disclosure, a joint member is disposed in the front side frame at a position directly behind the recessed up-down bead portion or the up-down-width enlarged portion. According to the abovementioned configuration, the joint member is provided directly behind the recessed up-down bead portion or the up-down-width enlarged portion, and hence a rigidity difference is formed between the recessed up-down bead portion and the up-down-width enlarged portion, and the joint member. As a result, the start of the compressive deformation is reliably induced, and the compressive deformation of the front side frame becomes possible.

In one embodiment of the present disclosure, a front subframe mounting portion is provided on a front end of the front side frame positioned on a vehicle front side of the front side portion of the front side frame, and the recessed up-down bead portion or the up-down-width enlarged portion is provided directly behind the front subframe mounting portion.

According to the abovementioned configuration, the front subframe mounting portion is provided on the front end of the front side frame positioned on the vehicle front side of the front side portion, and hence the subframe front portion can be supported while suppressing influence on the compressive deformation.

In one embodiment of the present disclosure, a reinforcement extending in the vehicle front-rear direction and joined to the rear side portion is included in the rear side portion of the front side frame. According to the abovementioned configuration, the rigidity of the rear side portion of the front side frame can be easily caused to be high as compared to the rigidity of the front side portion of the front side frame by the reinforcement.

In one embodiment of the present disclosure, fragile portions are formed in the reinforcement so as to be spaced apart from each other at a predetermined interval in the vehicle front-rear direction. The fragile portions may be formed by openings.

According to the abovementioned configuration, by forming the fragile portions in the reinforcement so as to be spaced apart from each other at a predetermined interval in the vehicle front-rear direction, rigidity differences can be alternately formed in the rear side portion of the front side frame in the vehicle front-rear direction. When the fragile portions are formed by the openings, the weight of the reinforcement can also be saved.

According to the present disclosure, the smooth compressive deformation of the front side frame from the front side thereof can be caused at the time of a frontal collision by forming a rigidity difference between the front side and the rear side of the front side frame and alternately forming rigidity differences in the vehicle front-rear direction in each of the regions.

DETAILED DESCRIPTION

As will now be described, enabling smooth compressive deformation of a front side frame from the front side thereof at the time of a vehicle frontal collision is achieved by a configuration of a front vehicle-body structure of a vehicle, the front vehicle-body structure including a pair of left and right front side frames extending in a vehicle front-rear direction. In the front vehicle-body structure, each of the front side frames is formed to have a closed cross-section shape when seen from the vehicle front-rear direction and is formed such that a rear side portion has a higher rigidity than a front side portion, and rigidity differences are alternately formed in the vehicle front-rear direction in each of regions of the front side portion and the rear side portion.

Embodiment 1

Figure 1:
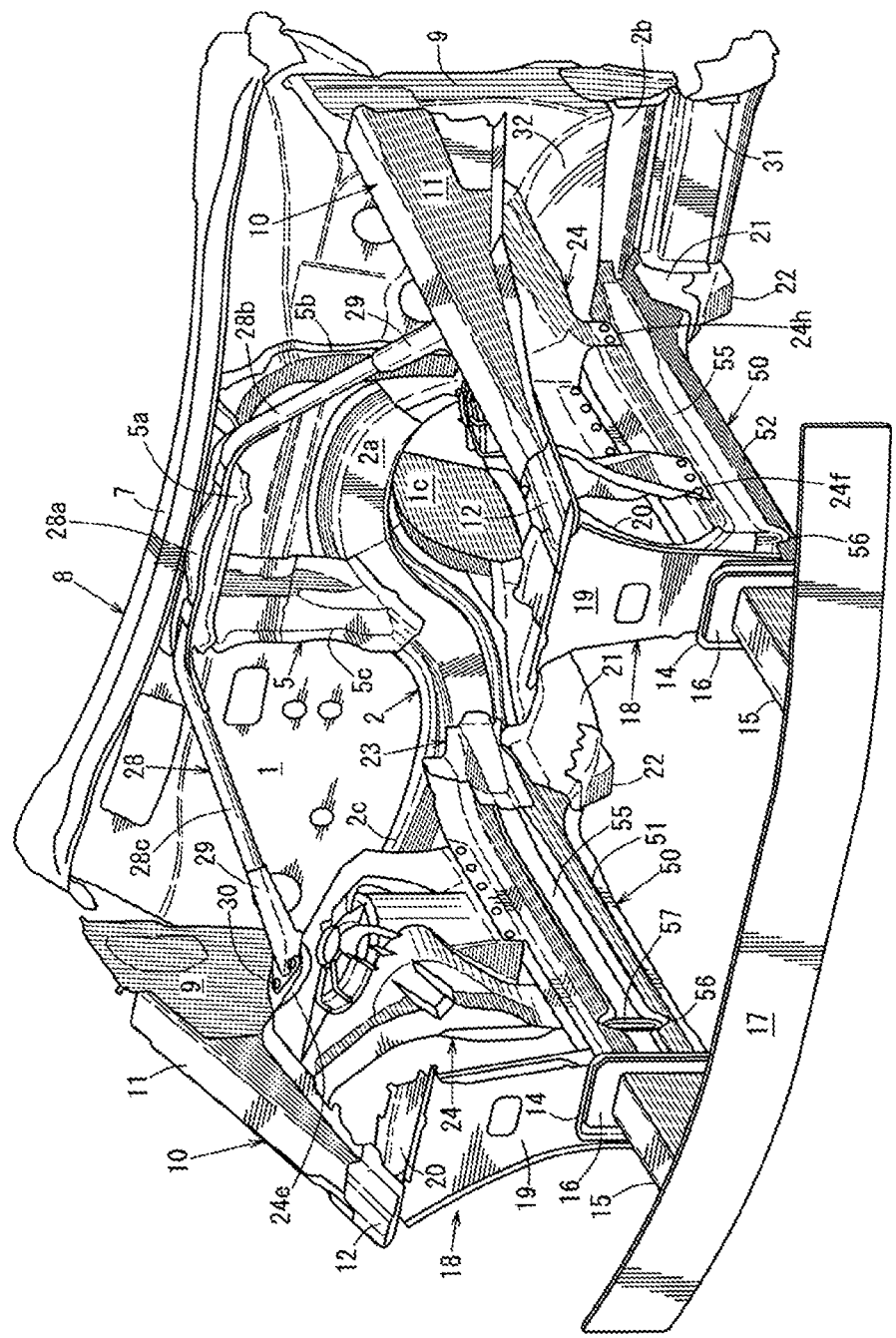
FIG. 1 is a perspective view illustrating a front vehicle-body structure of a vehicle of the present disclosure.
Figure 2:
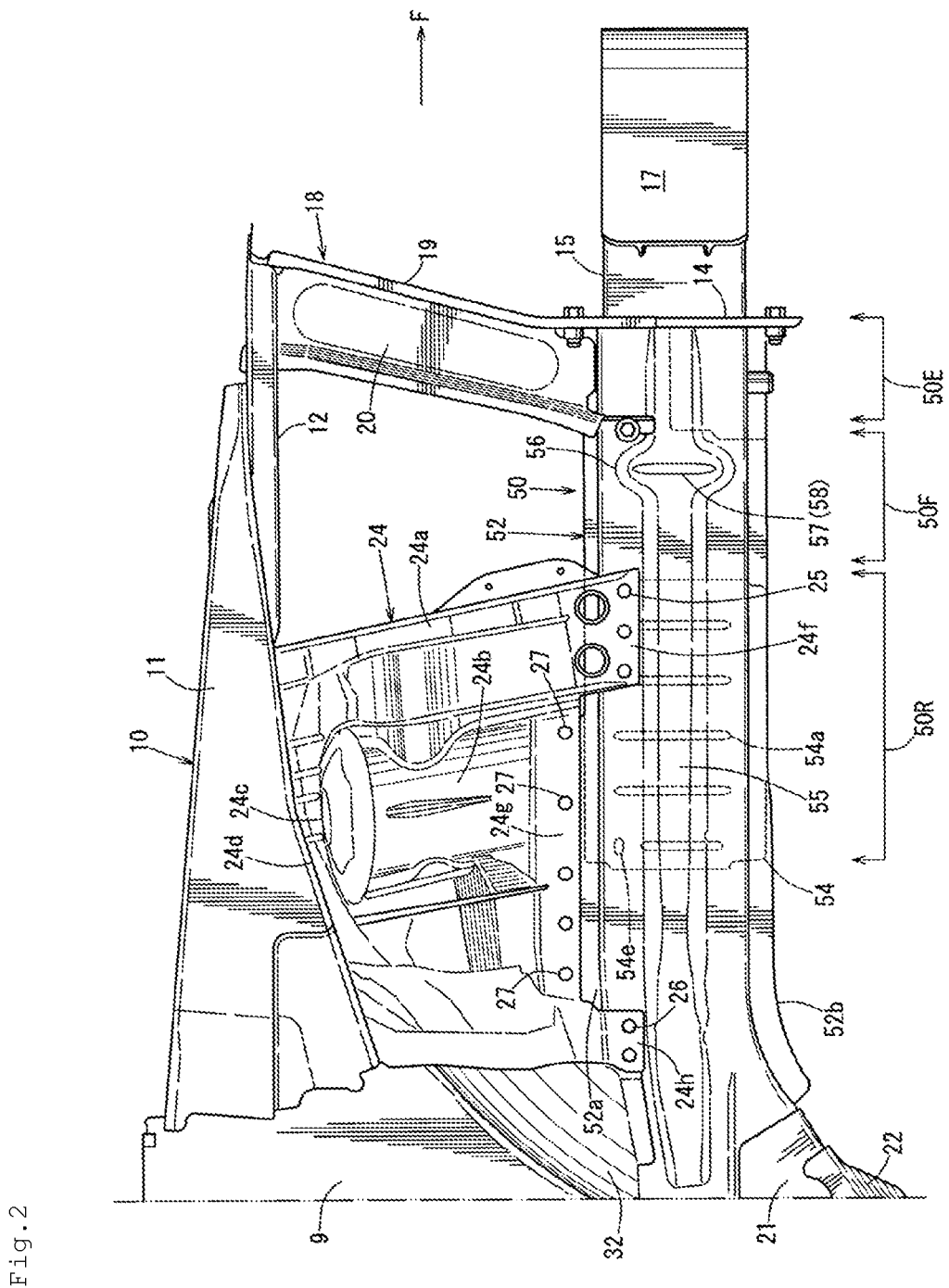
FIG. 2 is an outer side view illustrating the front vehicle-body structure on the vehicle right side.
Figure 3:
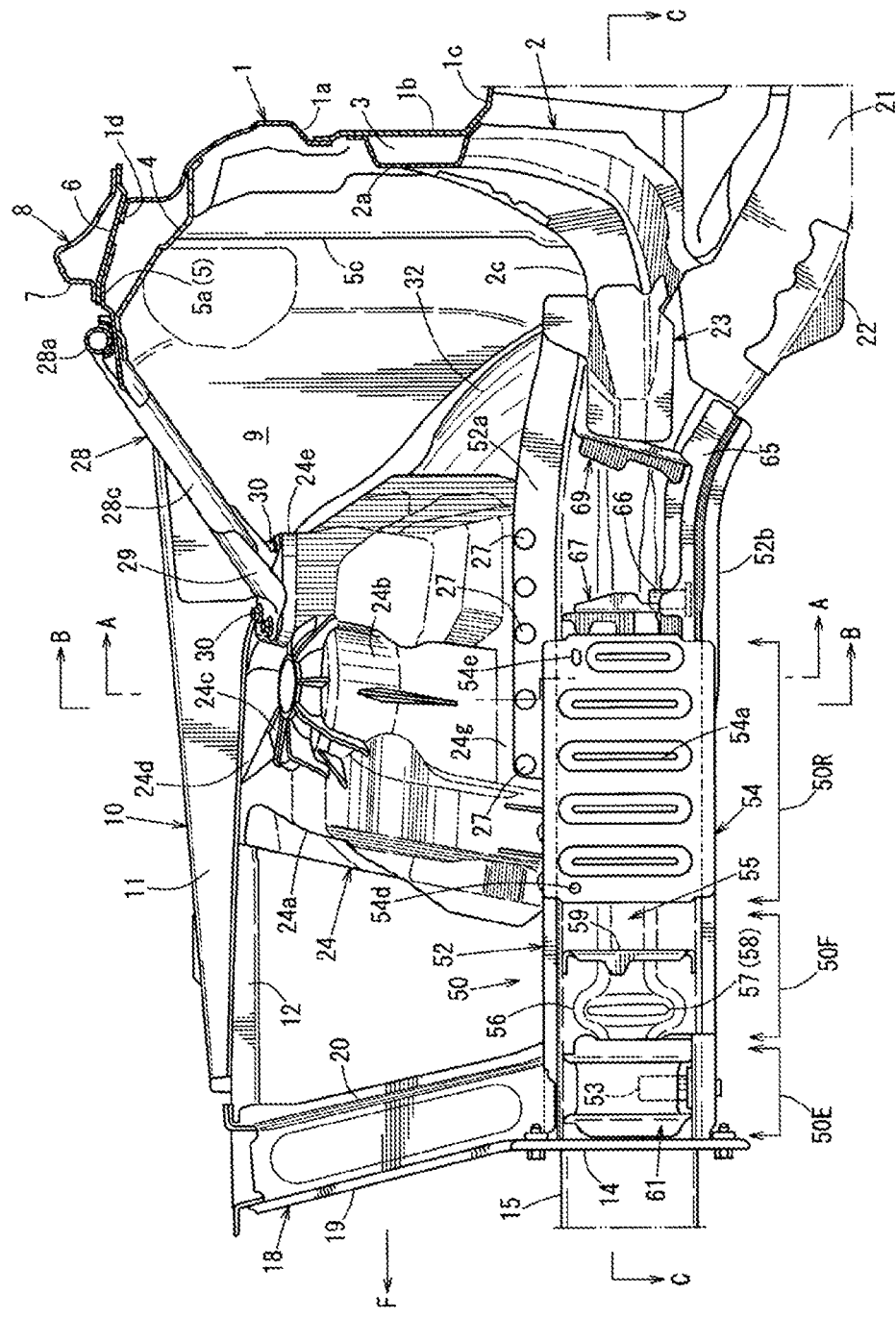
FIG. 3 is an inner side view of the front vehicle-body structure illustrated in state in which a front-side-frame inner portion is removed.
Figure 4:
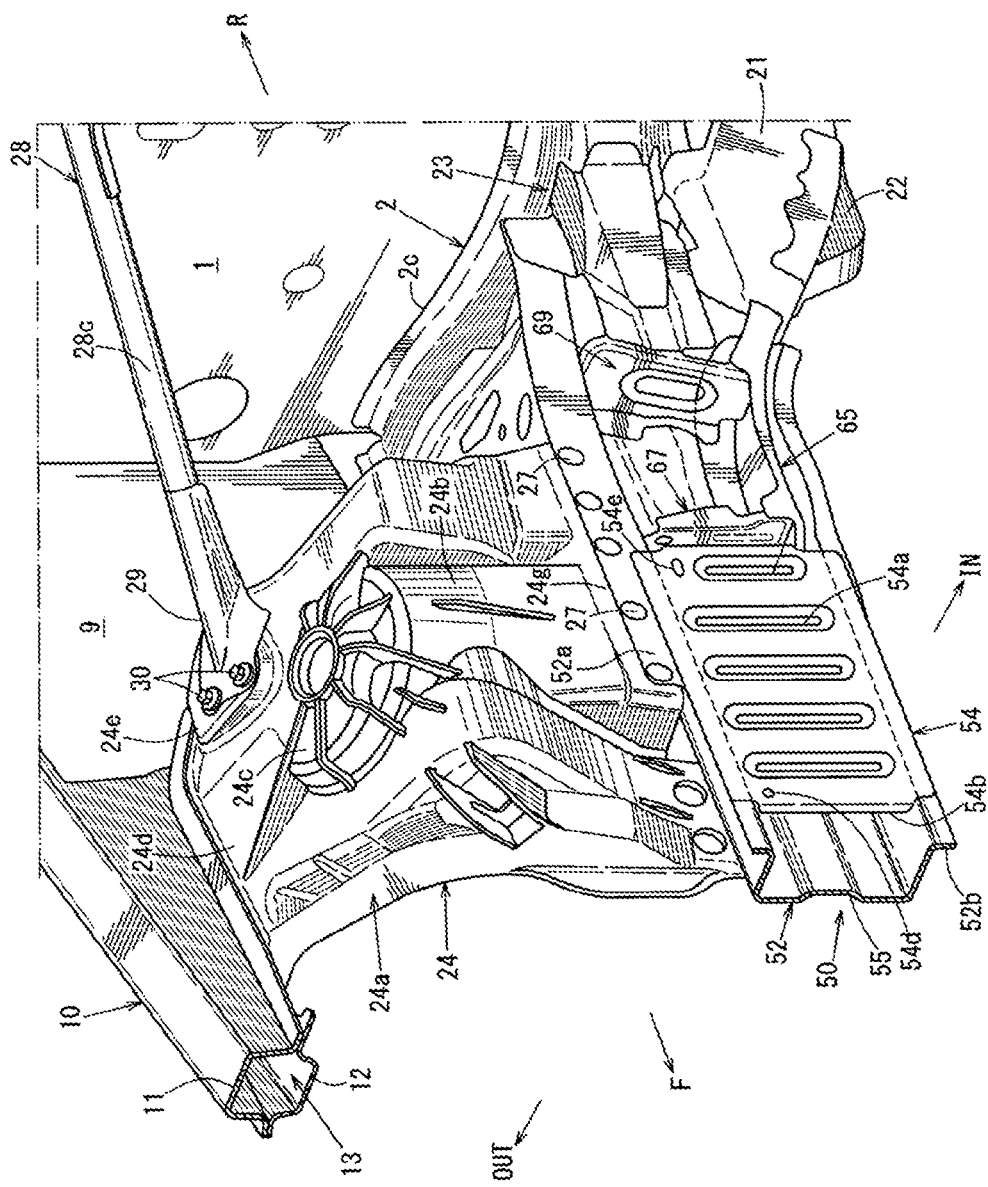
FIG. 4 is a main-part perspective view of FIG. 3.
Figure 5B:
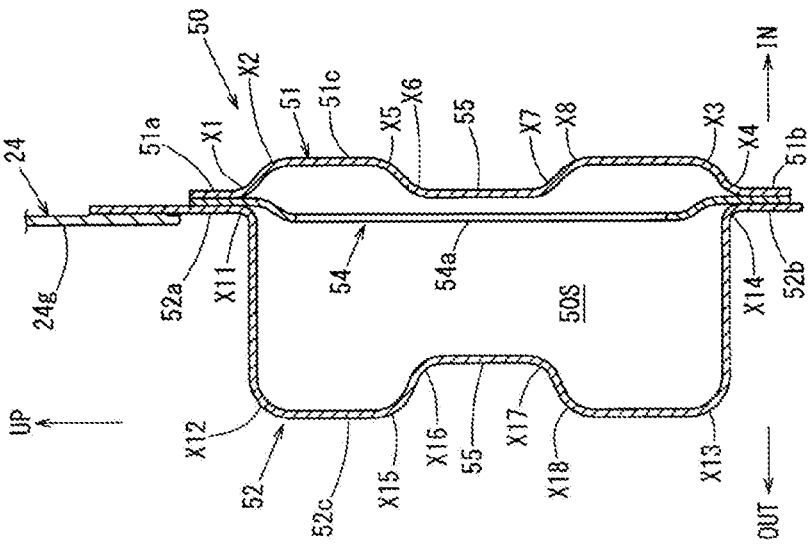
FIG. 5B illustrates a main-part enlarged cross-sectional view taken along line B-B in FIG. 3.
Figure 5A:
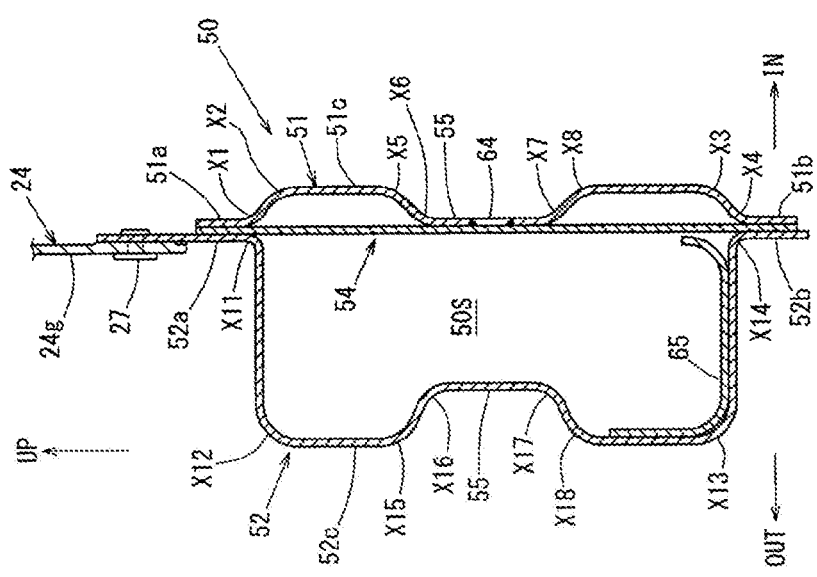
FIG. 5A illustrates a main-part enlarged cross-sectional view taken along line A-A in FIG. 3.
Figure 6:
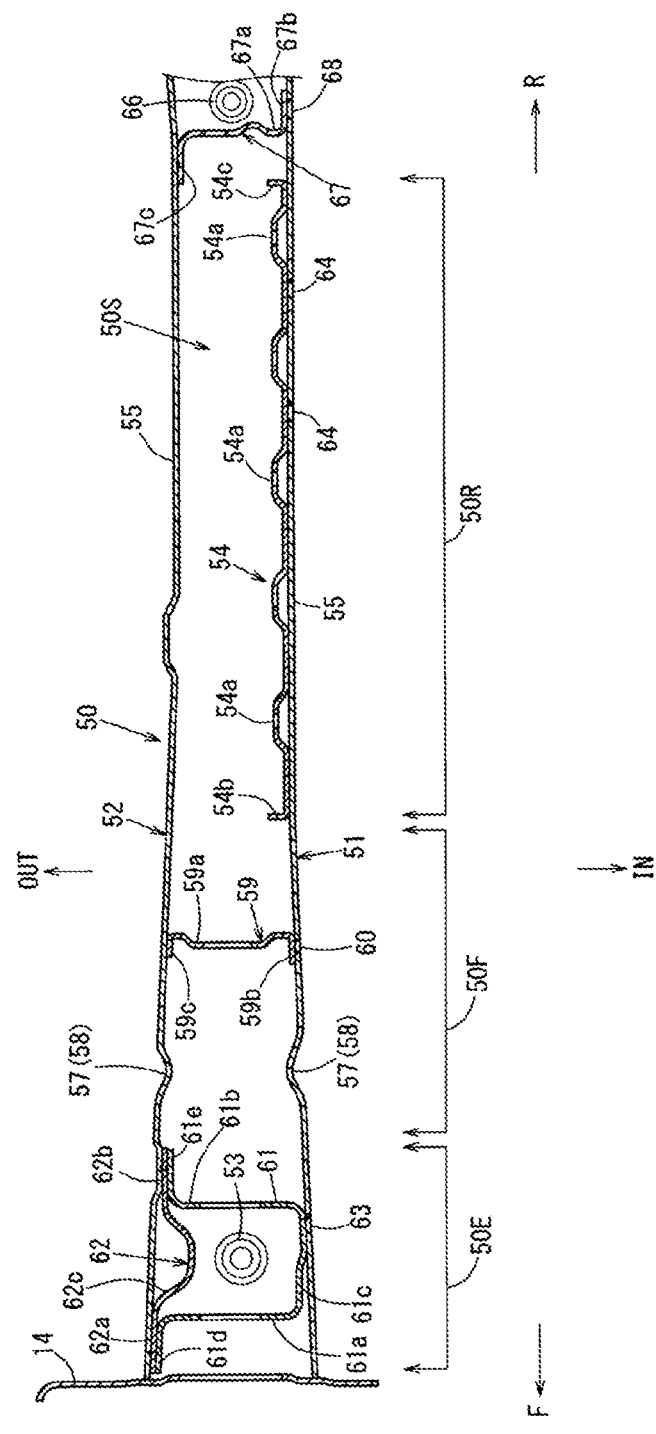
FIG. 6 is a main-part enlarged cross-sectional view taken along line C-C in FIG. 3.
Figure 7:
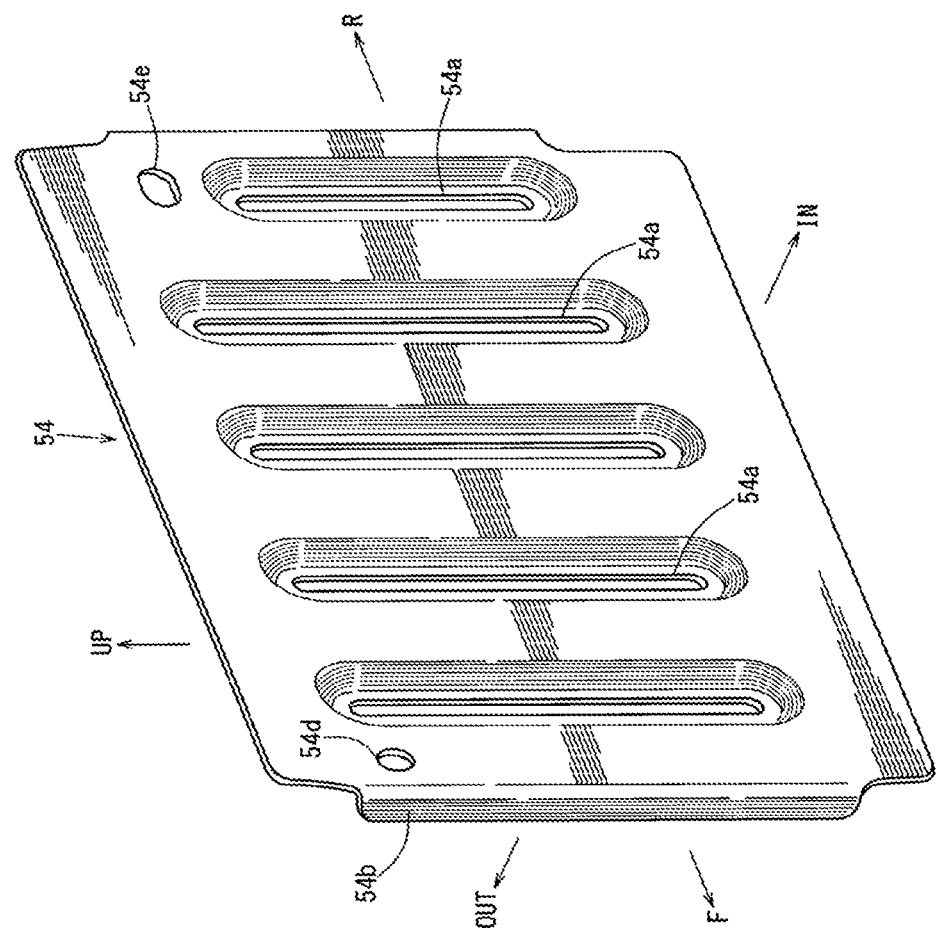
FIG. 7 is a perspective view illustrating a reinforcement.
Figure 8C:
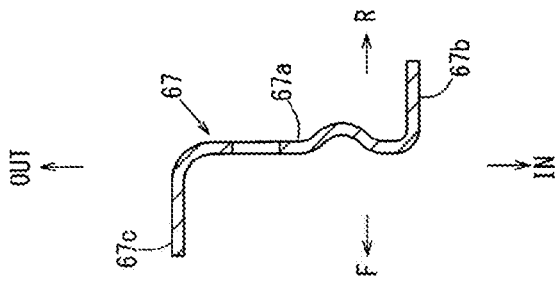
FIG. 8C is an enlarged plan view of an intermediate joint member.
Figure 8B:
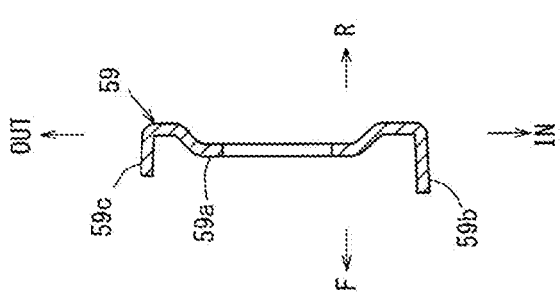
FIG. 8B is an enlarged plan view of a front portion joint member.
Figure 8A:
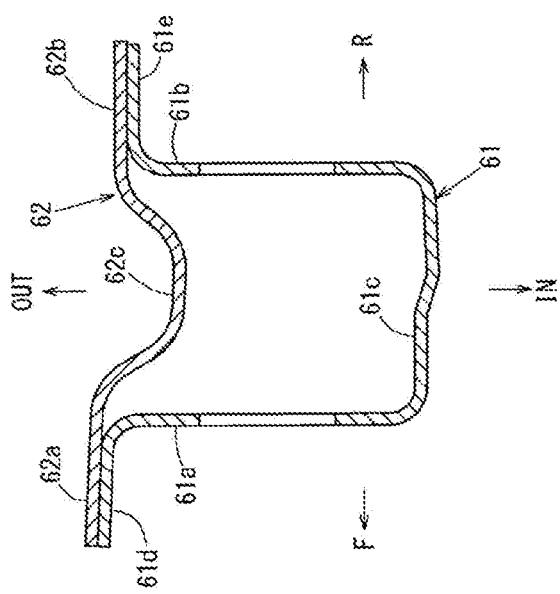
FIG. 8A is an enlarged plan view of a reinforcement member on a subframe front side mounting portion.

One embodiment of the present disclosure is described in detail with reference to the drawings below. The drawings illustrate a front vehicle-body structure of a vehicle. FIG. 1 is a perspective view illustrating the front vehicle-body structure of the vehicle, FIG. 2 is an outer side view illustrating the front vehicle-body structure, and FIG. 3 is an inner side view of the front vehicle-body structure illustrated in a state in which a front-side-frame inner portion is removed. FIG. 4 is a main-part perspective view of FIG. 3, FIG. 5A is a main-part enlarged cross-sectional view taken along line A-A in FIG. 3, FIG. 5B is a main-part enlarged cross-sectional view taken along line B-B in FIG. 3, FIG. 6 is a main-part enlarged cross-sectional view taken along line C-C in FIG. 3, and FIG. 7 is a perspective view illustrating a reinforcement. FIG. 8A is a plan view of a reinforcement member positioned on a subframe front side mounting portion, FIG. 8B is a plan view of a front portion joint member, and FIG. 8C is a plan view of an intermediate joint member.

FIG. 2 to FIG. 8C illustrate a structure on the vehicle right side, and hence the structure on the vehicle right side is mainly described in the description below, but the structure on the vehicle left side is formed to be bilaterally symmetrical or substantially bilaterally symmetrical to the structure on the right side.

In FIG. 3, a dash lower panel 1 that separates an engine room (however, a motor room in the case of an electric vehicle) and a vehicle cabin from each other in the vehicle front-rear direction is provided. In this embodiment, the dash lower panel 1 is divided into upper and lower two parts, that is, an upper panel 1a and a lower panel 1b. A tunnel portion 1c is formed in the center of a lower portion of the lower panel 1b in the vehicle width direction.

As illustrated in FIG. 1 and FIG. 3, on a front portion of the dash lower panel 1, a dash cross member 2 having a cross-sectional hat-shaped profile along the tunnel portion 1c and a lower portion of the dash lower panel 1 is provided, and a dash cross closed cross-section 3 (see FIG. 3) is formed between the dash cross member 2 and the dash lower panel 1. The dash cross member 2 includes an arch portion 2a that is a section corresponding to the tunnel portion 1c, and horizontal portions 2b and 2c extending to the vehicle-width-direction left and right outer sides from a lower portion of the arch portion 2a.

As illustrated in FIG. 3, on an upper portion of the dash lower panel 1, a cowl portion 8 formed by a dash reinforcement 4, a bridge portion 5a of a dash panel reinforcement member 5, a dash upper panel 6, and a cowl panel 7 is formed. The dash reinforcement 4 is a member extending to the vehicle front side from the upper portion of the dash lower panel 1. The bridge portion 5a of the dash panel reinforcement member 5 is a member extending in the vehicle front-rear direction with respect to a front portion of the dash reinforcement 4. The dash upper panel 6 is joined to a rear portion of the bridge portion 5a and an upper end bending portion 1d of the dash lower panel 1. The cowl panel 7 is joined to an upper portion of the dash upper panel 6.

As illustrated in FIG. 1, the dash panel reinforcement member 5 is formed by left and right leg portions 5b and 5c extending to the upper side from the dash cross member 2 corresponding to the left and right of the tunnel portion 1c, and the bridge portion 5a that connects upper end portions of the leg portions 5b and 5c to each other in the vehicle width direction. A closed cross-section (not shown) extending in the up-down direction is formed between the left and right leg portions 5b and 5c and the dash lower panel 1.

Hinge pillars (not shown) that are vehicle body strengthening members are mounted on both of vehicle-width-direction left and right ends of the cowl portion 8 and the dash lower panel 1, and apron reinforcements 10 are provided on front portions of the hinge pillars via apron panels 9 as illustrated in FIG. 1 to FIG. 4.

The apron reinforcement 10 is a strengthening member extending in the vehicle front-rear direction, and the apron reinforcement 10 is formed by joining an apron reinforcement upper portion 11 having a cross-sectional hat-shaped profile and an apron reinforcement lower portion 12 having a cross-sectional inverted-hat-shaped profile to each other as illustrated in FIG. 4. An apron reinforcement closed cross-section 13 extending in the front-rear direction of the vehicle is formed between the apron reinforcement upper portion 11 and the apron reinforcement lower portion 12.

As illustrated in FIG. 1, on the vehicle-width-direction inner sides and lower sides with respect to the apron reinforcements 10, a pair of left and right front side frames 50 and 50 extending to the front side of the vehicle from the dash lower panel 1 including the dash cross member 2 are provided. The front side frames 50 are vehicle body strengthening members extending in the front-rear direction of the vehicle on both of left and right sides of the engine room.

As illustrated in FIG. 1, set plates 14 are mounted on front ends of the front side frames 50, and mounting plates 16 on rear end portions of crash cans 15 are fastened and fixed to the set plates 14.

A bumper beam 17 extending in the vehicle width direction is mounted on the front portions of the pair of left and right front side frames 50 and 50 via the set plates 14, the mounting plates 16, and the crash cans 15.

As illustrated in FIG. 1 to FIG. 3, a front portion of the front side frame 50 and a front portion of the apron reinforcement lower portion 12 are connected to each other by a shroud side 18 extending in the up-down direction. As illustrated in the same drawings, the shroud side 18 includes a shroud side front side member 19 and a shroud side rear side member 20. Upper end portions of the left and right shroud sides 18 and 18 are connected to each other by a shroud upper portion (not shown) in the vehicle width direction.

As illustrated in FIG. 1 to FIG. 4, on a rear end portion of the front side frame 50, a floor frame 21 extending to the vehicle rear side from the rear end portion of the front side frame 50 along a lower surface of the floor panel is provided. The floor frame 21 is a vehicle body strengthening member extending in the vehicle front-rear direction so as to be continuous with the front side frame 50, and a floor frame closed cross-section (not shown) extending in the front-rear direction of the vehicle is formed between the floor panel and the floor frame 21. On a subframe rear side mounting position in the floor frame 21, a subframe mounting seat 22 is mounted.

As illustrated in FIG. 5A and FIG. 5B, the front side frame 50 is formed by joining upper and lower joining flange portions 51a, 52a, 51b, and 52b of a front-side-frame inner portion 51 and a front-side-frame outer portion 52. As illustrated in FIG. 1, a gusset member 23 is diagonally mounted between a rear portion of the front-side-frame inner portion 51 and the horizontal portion 2c of the dash cross member 2 positioned on the rear side thereof.

As illustrated in FIG. 1 to FIG. 4, a front suspension tower portion 24 (hereinafter simply abbreviated to a suspension tower portion 24) made by aluminum casting is mounted between the apron reinforcement 10 and the front side frame 50.

As illustrated in FIG. 2 to FIG. 4, in the suspension tower portion 24, a tower portion 24b, a suspension top portion 24c, an upper wall portion 24d, a tower bar mounting seat 24e protruding to the upper side from a rear portion of the upper wall portion 24d, a front lower mounting portion 24f, an intermediate lower side mounting portion 24g, and a rear lower mounting portion 24h are integrally formed on a suspension housing 24a.

On the upper wall portion 24d of the suspension tower portion 24, the apron reinforcement upper portion 11 is mounted with use of rivets (not shown). As illustrated in FIG. 2, the front lower mounting portion 24f is mounted on the front-side-frame outer portion 52 with use of a plurality of rivets 25. Similarly, as illustrated in FIG. 2, the rear lower mounting portion 24h is mounted on the front-side-frame outer portion 52 with use of a plurality of rivets 26. As illustrated in FIG. 2 to FIG. 4 and FIG. 5A, the intermediate lower side mounting portion 24g is mounted on the joining flange portion 52a (in detail, an upper side extending portion thereof) on the upper side of the front-side-frame outer portion 52 with use of a plurality of rivets 27. As the rivets 25, 26, and 27, self-piercing rivets (so-called SPRs) can be used.

As illustrated in FIG. 1, a substantially V-shaped tower bar 28 of which vehicle front side is opened in a plan view is provided. The tower bar 28 includes a base portion 28a, left and right slant portions 28b and 28c, and brackets 29 and 29 fixed to front end portions of the slant portions 28b and 28c. As illustrated in FIG. 1 and FIG. 3, the base portion 28a of the tower bar 28 is fixed to the bridge portion 5a of the dash panel reinforcement member 5, and the brackets 29 are fixed to the tower bar mounting seats 24e of the suspension tower portions 24 with use of a plurality of fastening members 30.

By the tower bar 28, the displacement of the suspension tower portion 24 is suppressed and the steering stability and the ride quality are improved. In FIG. 1, reference numeral 31 denotes a torque box. In FIG. 1 to FIG. 3, reference numeral 32 denotes a wheel well.

As illustrated in FIG. 2, FIG. 3, and FIG. 6, the front side frame 50 includes a front end 50E, a front side portion 50F, and a rear side portion 50R. The front end 50E of the front side frame 50 is a region in which a weld nut 53 serving as a front subframe mounting portion on which the front side of a subframe is mounted is provided. The rear side portion 50R of the front side frame 50 is a region in which a reinforcement 54 described below is joined at a position corresponding to at least the tower portion 24b of the suspension tower portion 24. The front side portion 50F of the front side frame 50 is a region positioned between the front end 50E and the rear side portion 50R.

In the front side frame 50, the rear side portion 50R is formed to have a higher rigidity than the front side portion 50F. Specifically, the reinforcement 54 extending in the vehicle front-rear direction and joined to the rear side portion 50R is included in the rear side portion 50R of the front side frame 50, while no reinforcement is provided in the front side portion 50F. As a result, the rear side portion 50R is formed to have a higher rigidity than the front side portion 50F.

In each of the regions of the front side portion 50F and the rear side portion 50R, rigidity differences are alternately formed in the vehicle front-rear direction. Specifically, in the front side portion 50F of the front side frame 50, as illustrated in FIG. 6, a low rigidity portion 58 of which rigidity is the lowest is formed by a recessed up-down bead portion 57, and a front portion joint member 59 is disposed in the front side frame 50 at a place directly behind the recessed up-down bead portion 57. As a result, in the front side portion 50F, the rigidity differences are alternately formed in the vehicle front-rear direction. Details of the elements 57, 58, and 59 are described below.

In the rear side portion 50R of the front side frame 50, as illustrated in FIG. 6, the rigidity differences are alternately formed in the vehicle front-rear direction in the rear side portion 50R by forming a plurality of oval openings 54a serving as fragile portions in the reinforcement 54 so as to be spaced apart from each other at a predetermined interval in the vehicle front-rear direction.

In other words, in the front side frame 50, the rear side portion 50R is formed to have a higher rigidity than the front side portion 50F and the rigidity differences are alternately formed in the vehicle front-rear direction in each of the regions of the front side portion 50F and the rear side portion 50R.

As a result, compressive deformation starts from the front side portion 50F of the front side frame 50 of which rigidity is relatively low at the time of a vehicle frontal collision. Then, the rear side portion 50R of the front side frame 50 of which rigidity is relatively high is compressively deformed, to thereby compressively deform the front side frame 50 in a smooth bellows form from the front side portion 50F across the entire longitudinal direction.

As illustrated in FIG. 5A and FIG. 5B, the front side frame 50 includes an outer wall surface portion 52c (a vertical wall surface portion of the front-side-frame outer portion 52) and an inner wall surface portion 51c (a vertical wall surface portion of the front-side-frame inner portion 51).

As illustrated in FIG. 5A and FIG. 5B, the front-side-frame inner portion 51 has a cross-section formed in sideways-hat-shape by the upper and lower joining flange portions 51a and 51b and the inner wall surface portion 51c. Similarly, the front-side-frame outer portion 52 has a cross-section formed in sideways-hat-shape by the upper and lower joining flange portions 52a and 52b and the outer wall surface portion 52c. As illustrated in the same drawings, recessed front-rear bead portions 55 extending in the front-rear direction of the vehicle are formed in the outer wall surface portion 52c and the inner wall surface portion 51c of the front side frame 50.

By the recessed front-rear bead portion 55 formed in the front-side-frame inner portion 51, ridges X5 to X8 due to the recessed front-rear bead portion 55 are formed in an increased manner with respect to original ridges X1 to X4 in the front-side-frame inner portion 51.

Similarly, by the recessed front-rear bead portion 55 formed in the front-side-frame outer portion 52, ridges X15 to X18 due to the recessed front-rear bead portion 55 are formed in an increased manner with respect to original ridges X11 to X14 in the front-side-frame outer portion 52.

As illustrated in FIG. 1 to FIG. 3, at a position in the front side portion 50F of the front side frame 50 close to the front side, an up-down-width enlarged portion 56 at which the up-down width of the recessed front-rear bead portion 55 is enlarged in the up-down direction is formed. The up-down-width enlarged portion 56 is formed in each of positions in the front-side-frame inner portion 51 and the front-side-frame outer portion 52 facing each other in the vehicle width direction.

As illustrated in FIG. 2, FIG. 3, and FIG. 6, the recessed up-down bead portion 57 extending in the up-down direction and recessed to the inner side of the front side frame 50 as compared to the recessed front-rear bead portion 55 is formed in the up-down-width enlarged portion 56 within the range of the up-down width thereof. The low rigidity portion 58 is formed by the recessed up-down bead portion 57.

By forming the recessed up-down bead portion 57 (low rigidity portion 58), when the front side frame 50 is compressively deformed from the front side portion 50F at the time of a vehicle frontal collision, the low rigidity portion 58 obtained by the recessed up-down bead portion 57 formed in a position in the front side portion 50F that is close to the front side serves as a breaking starting point. As a result, deformation from the middle of the front side portion 50F of the front side frame 50 in the front-rear direction is suppressed, and deformation from a position in the front side portion 50F of the front side frame 50 close to the front side becomes possible.

The front portion joint member 59 illustrated in FIG. 6 is positioned in the front side frame 50 at a place directly behind the recessed up-down bead portion 57 or the up-down-width enlarged portion 56, and a rigidity difference is formed by the front portion joint member 59 and the recessed up-down bead portion 57 (or the up-down-width enlarged portion 56). As a result, the start of the compressive deformation is reliably induced, and the compressive deformation of the front side frame 50 in a bellows form becomes possible.

As illustrated in FIG. 8B, the front portion joint member 59 includes a joint 59a extending in the vehicle width direction, and flanges 59b and 59c formed so as to be integrally bent toward the vehicle front side from both of vehicle-width-direction ends of the joint 59a. As illustrated in FIG. 6, the flange 59b on the vehicle-width-direction inner side is fixed to the inner surface of the front-side-frame inner portion 51 with use of an opening 60 for arc welding formed in the front-side-frame inner portion 51. The flange 59c on the vehicle-width-direction outer side is fixed to the inner surface of the front-side-frame outer portion 52 by spot welding means.

As illustrated in FIG. 3 and FIG. 6, in the front end 50E of the front side frame 50 positioned on the vehicle front side of the front side portion 50F of the front side frame 50, the weld nut 53 is provided as the front subframe mounting portion. The recessed up-down bead portion 57 or the up-down-width enlarged portion 56 is provided directly behind the weld nut 53.

By providing the weld nut 53 serving as the front subframe mounting portion in the front end 50E of the front side frame 50 positioned on the vehicle front side of the front side portion 50F and providing the recessed up-down bead portion 57 and the up-down-width enlarged portion 56 directly behind the weld nut 53, the subframe front portion can be supported while suppressing influence on the compressive deformation.

As illustrated in FIG. 6, the periphery of the weld nut 53 is strengthened by an inner-side reinforcement member 61 and an outer-side reinforcement member 62 disposed in the front side frame 50. As illustrated in FIG. 8A, the inner-side reinforcement member 61 is obtained by integrally forming a front wall 61a and a rear wall 61b extending in the vehicle width direction, an inner wall 61c connecting vehicle-width-direction inner ends of those walls 61a and 61b to each other in the front-rear direction, a flange 61d extending from a vehicle-width-direction outer end of the front wall 61b to the front side, and a flange 61e extending from a vehicle-width-direction outer end of the rear wall 61b to the rear side. The outer-side reinforcement member 62 is obtained by integrally connecting front and rear flanges 62a and 62b to each other by a connecting wall 62c in the front-rear direction.

As illustrated in FIG. 6, the inner wall 61c of the inner-side reinforcement member 61 is fixed to the inner surface of the front-side-frame inner portion 51 with use of an opening 63 for arc welding formed in the front-side-frame inner portion 51.

The flanges 61d and 62a on the front side of the inner-side reinforcement member 61 and the outer-side reinforcement member 62 are three-piece-joined and fixed to the front-side-frame outer portion 52 by spot welding means. Similarly, flanges 61e and 62b on the rear side of the inner-side reinforcement member 61 and the outer-side reinforcement member 62 are also three-piece-joined and fixed to the front-side-frame outer portion 52 by spot welding means. By the reinforcement members 61 and 62, the supporting rigidity of the subframe front portion is improved.

As illustrated in FIGS. 5A and 5B, the reinforcement 54 has an upper end portion that is interposed and fixed between the upper joining flange portion 51a of the front-side-frame inner portion 51 and the upper joining flange portion 52a of the front-side-frame outer portion 52. Similarly, a lower end portion of the reinforcement 54 is interposed and fixed between the lower joining flange portion 51b of the front-side-frame inner portion 51 and the lower joining flange portion 52b of the front-side-frame outer portion 52.

As illustrated in FIGS. SA, 5B and 6, the reinforcement 54 is fixed to the inner surface of the front-side-frame inner portion 51 with use of a plurality of openings 64 and 64 for arc welding formed in a recessed bottom portion of the recessed front-rear bead portion 55 of the front-side-frame inner portion 51.

As illustrated in FIG. 6 and FIG. 7, on both of front and rear end portions of the reinforcement 54, bending portions 54b and 54c extending from both of the end portions to the vehicle-width-direction outer side are integrally formed. Positioning openings 54d and 54e for the time of production are formed in the reinforcement 54 at front and rear places on the upper side thereof.

As illustrated in FIG. 3, FIG. 4, and FIGS. 5A and 5B, a lower portion reinforcement member 65 extending from a position corresponding to a rear end portion of the reinforcement 54 to a rear end portion of the front side frame 50 in the front-rear direction is provided. As illustrated in FIG. 5A, the lower portion reinforcement member 65 is disposed on an inner bottom portion of the front-side-frame outer portion 52 so as to have a recessed shape in cross-section.

As illustrated in FIG. 3 and FIG. 6, a front-rear-direction intermediate portion of the front subframe is mounted on a lower surface of the front side frame 50 at a position directly behind the reinforcement 54. In order to mount the front-rear-direction intermediate portion of the front subframe, a weld nut 66 serving as a subframe intermediate mounting portion is provided in a position directly behind the reinforcement 54.

As illustrated in FIG. 3, FIG. 4, and FIG. 6, an intermediate joint member 67 is provided in the front side frame closed cross-section 50S in a position directly in front of the weld nut 66 and in a position directly behind the reinforcement 54.

As illustrated in FIG. 6 and FIG. 8C, the intermediate joint member 67 is obtained by integrally forming a joint 67a extending in the vehicle width direction, a flange 67b extending from a vehicle-width-direction inner end of the joint 67a to the rear side, and a flange 67c extending from a vehicle-width-direction outer end of the joint 67a to the front side.

As illustrated in FIG. 6, the flange 67b of the intermediate joint member 67 is fixed to the inner surface of the front-side-frame inner portion 51 with use of an opening 68 for arc welding formed in the front-side-frame inner portion 51. The flange 67c of the intermediate joint member 67 is joined and fixed to the inner surface of the front-side-frame outer portion 52 by spot welding means.

As illustrated in FIG. 3 and FIG. 4, a rear portion joint member 69 is disposed in a place in the front side frame closed cross-section 50S corresponding to a front end of the gusset member 23. In the drawings, arrow F indicates the vehicle front side, arrow R indicates the vehicle rear side, arrow IN indicates the vehicle-width-direction inner side, arrow OUT indicates the vehicle-width-direction outer side, and arrow UP indicates the vehicle upper side.

In the front vehicle-body structure of the vehicle formed as above, at the time of a vehicle frontal collision, the low rigidity portion 58 obtained by the recessed up-down bead portion 57 serves as a breaking starting point of the front side frame 50, and the front side portion 50F is compressively deformed into a bellows form first. Then, the rear side portion 50R of which rigidity is higher than that of the front side portion 50F is compressively deformed in a bellows form. As a result, the front side frame 50 can be compressively deformed in a smooth bellows form from the front side portion 50F across the entire longitudinal direction.

The front-side-frame outer portion 52 and the suspension tower portion 24 are fastened to each other by the rivets 25, 26, and 27, but the mounting portions 24f, 25g, and 24h of the suspension tower portion 24 made by aluminum casting are damaged and the rivets 25, 26, and 27 come off from the suspension tower portion 24 at the time of a compressive deformation of the front side frame 50. Therefore, no problems are caused regarding the compressive deformation.

As described in detail above, the front vehicle-body structure of the vehicle of the abovementioned embodiment is a front vehicle-body structure of a vehicle including the pair of left and right front side frames 50 and 50 extending in the vehicle front-rear direction. In the front vehicle-body structure, each of the front side frames 50 and 50 is formed to have a closed cross-section shape when seen from the vehicle front-rear direction and is formed such that the rear side portion 50R has a higher rigidity than the front side portion 50F, and rigidity differences are alternately formed in the vehicle front-rear direction in each of regions of the front side portion 50F and the rear side portion 50R (see FIG. 1 and FIG. 3).

According to this configuration, the following effect is obtained. In other words, the rigidity differences are alternately formed in the vehicle front-rear direction in each of the regions of the front side portion 50F and the rear side portion 50R of the front side frame 50, and hence the compressive deformation starts from the front side portion 50F of the front side frame 50 of which rigidity is relatively low at the time of a vehicle frontal collision. Then, the rear side portion 50R of the front side frame 50 of which rigidity is relatively high is compressively deformed. Therefore, the front side frame 50 can be compressively deformed in a smooth bellows form from the front side portion 50F across the entire longitudinal direction.

In one embodiment of the present disclosure, the front side frame 50 includes the outer wall surface portion 52c and the inner wall surface portion 51c, the recessed front-rear bead portion 55 extending in the vehicle front-rear direction is included in each of the outer wall surface portion 52c and the inner wall surface portion 51c of the front side frame 50, the up-down-width enlarged portion 56 in which the up-down width of the recessed front-rear bead portion 55 is enlarged is formed in a position in the front side portion 50F of the front side frame 50 that is close to the front side, and the up-down-width enlarged portion 56 includes the low rigidity portion 58 in which the recessed up-down bead portion 57, which is recessed to the inner side of the front side frame 50 more than the recessed front-rear bead portion 55 and which extends in the up-down direction, is formed, the low rigidity portion 58 having the lowest rigidity in the regions of the front side portion 50F and the rear side portion 50R of the front side frame 50 (see FIG. 3 to FIG. 6).

According to this configuration, the recessed front-rear bead portions 55 extending in the vehicle front-rear direction are formed in the outer wall surface portion 52c and the inner wall surface portion 51c of the front side frame 50, and hence the ridges X5 to X8 and X15 to X18 can be increased by the recessed front-rear bead portions 55, and the cross-sectional rigidity of the front side frame 50 with respect to the vehicle front-rear direction can be improved.

The low rigidity portion 58 is formed by the recessed up-down bead portion 57. Thus, when the front side frame 50 is compressively deformed from the front side portion 50F at the time of a vehicle frontal collision, the low rigidity portion 58 obtained by the recessed up-down bead portion 57 formed in a position therein close to the front side serves as the breaking starting point. Therefore, deformation from the middle of the front-rear direction of the front side portion 50F of the front side frame 50 is suppressed, and deformation from a position in the front side portion 50F of the front side frame 50 that is close to the front side becomes possible. Therefore, the front side frame 50 can be compressively deformed from the front side in a reliable manner.

In one embodiment of the present disclosure, the joint member (see the front portion joint member 59) is disposed in the front side frame 50 at a position directly behind the recessed up-down bead portion 57 or the up-down-width enlarged portion 56 (see FIG. 3 and FIG. 6).

According to this configuration, the joint member (front portion joint member 59) is provided directly behind the recessed up-down bead portion 57 or the up-down-width enlarged portion 56, and hence a rigidity difference is formed between the recessed up-down bead portion 57 and the up-down-width enlarged portion 56, and the joint member (front portion joint member 59). As a result, the start of the compressive deformation is reliably induced, and the compressive deformation of the front side frame 50 in a bellows form becomes possible.

In one embodiment of the present disclosure, the front subframe mounting portion (see the weld nut 53) is provided on the front end 50E of the front side frame 50 positioned on the vehicle front side of the front side portion 50F of the front side frame 50, and the recessed up-down bead portion 57 or the up-down-width enlarged portion 56 is provided directly behind the front subframe mounting portion (weld nut 53) (see FIG. 3 and FIG. 6).

According to this configuration, the front subframe mounting portion (weld nut 53) is provided on the front end 50E of the front side frame 50 positioned on the vehicle front side of the front side portion 50F, and hence the subframe front portion can be supported while suppressing influence on the compressive deformation.

In one embodiment of the present disclosure, the reinforcement 54 extending in the vehicle front-rear direction and joined to the rear side portion 50R is included in the rear side portion 50R of the front side frame 50 (see FIG. 3 to FIG. 6).

According to this configuration, the rigidity of the rear side portion 50R of the front side frame 50 can be easily caused to be high as compared to the rigidity of the front side portion 50F of the front side frame 50 by the reinforcement 54. In one embodiment of the present disclosure, the fragile portions (see the openings Ma) are formed in the reinforcement 54 so as to be spaced apart from each other at a predetermined interval in the vehicle front-rear direction (see FIG. 7).

According to this configuration, by forming the fragile portions (openings 54a) in the reinforcement 54 so as to be spaced apart from each other at a predetermined interval in the vehicle front-rear direction, rigidity differences can be alternately formed in the rear side portion 50R of the front side frame 50 in the vehicle front-rear direction. As described in the abovementioned embodiment, when the fragile portions are formed by the openings 54a, the weight of the reinforcement 54 can also be saved.

Embodiment 2

Figure 9:
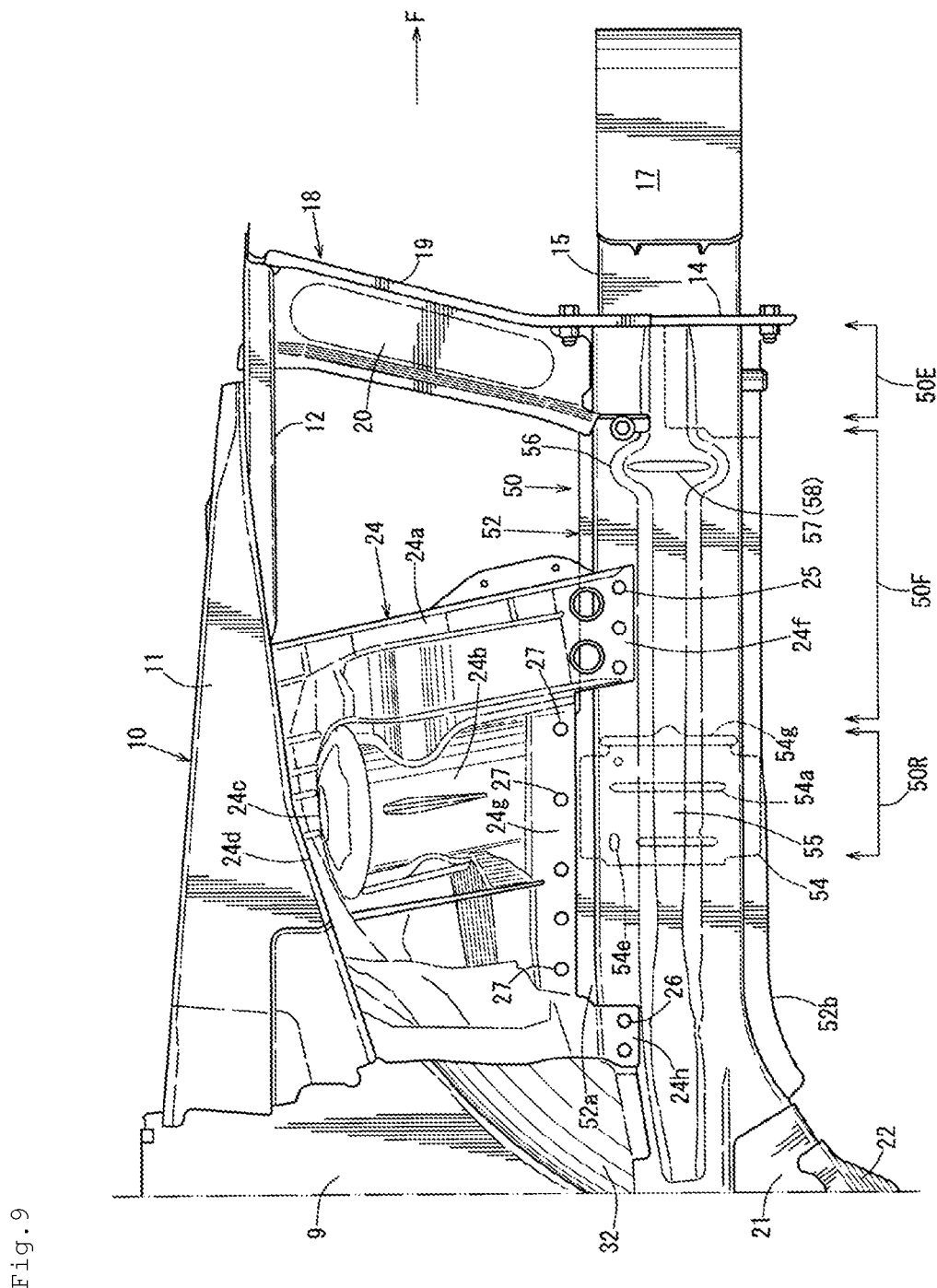
FIG. 9 is an outer side view illustrating another embodiment of a front vehicle-body structure on the vehicle right side.
Figure 10:
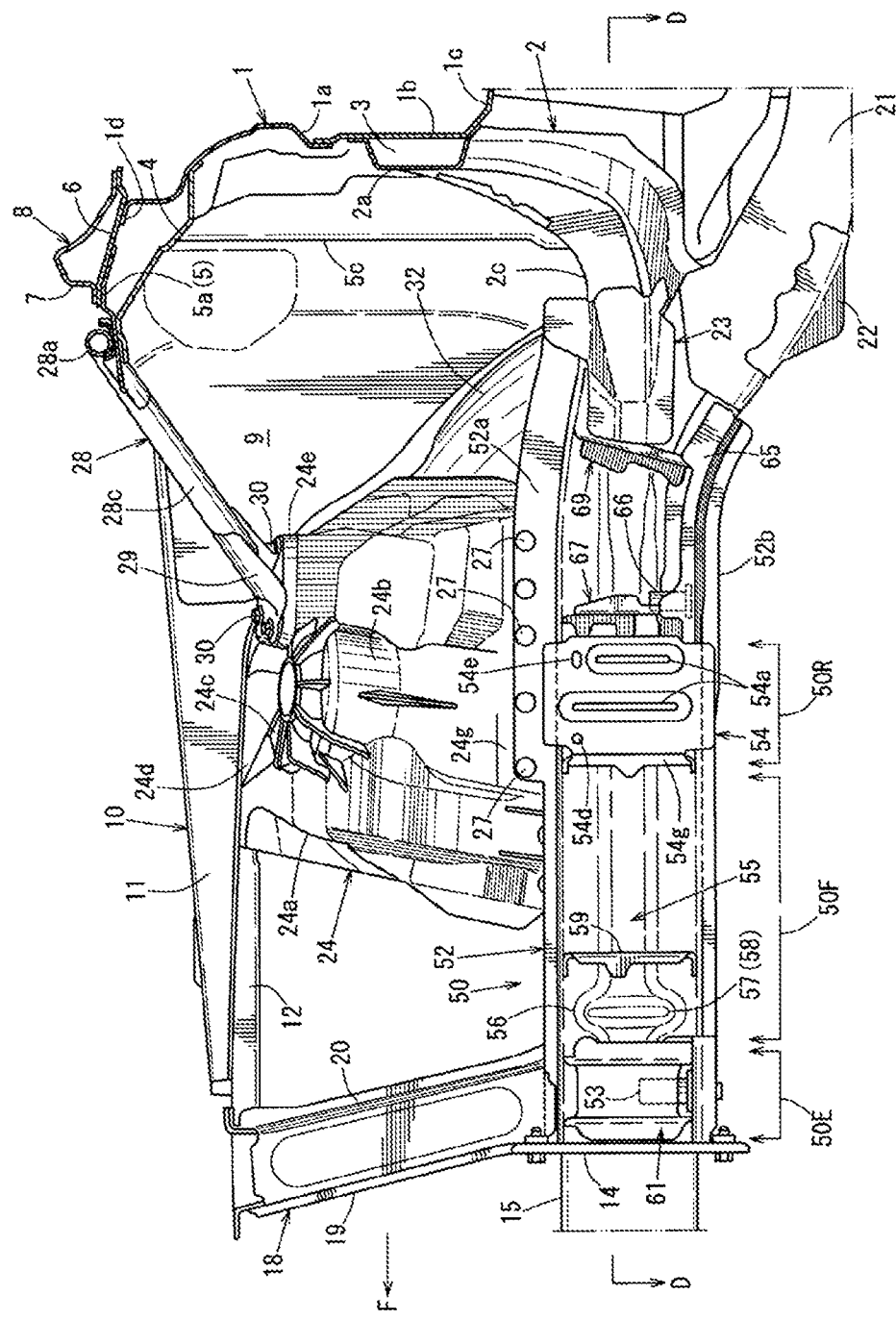
FIG. 10 is an inner side view illustrating the other embodiment of the front vehicle-body structure in a state in which a front-side-frame inner portion is removed.
Figure 11:
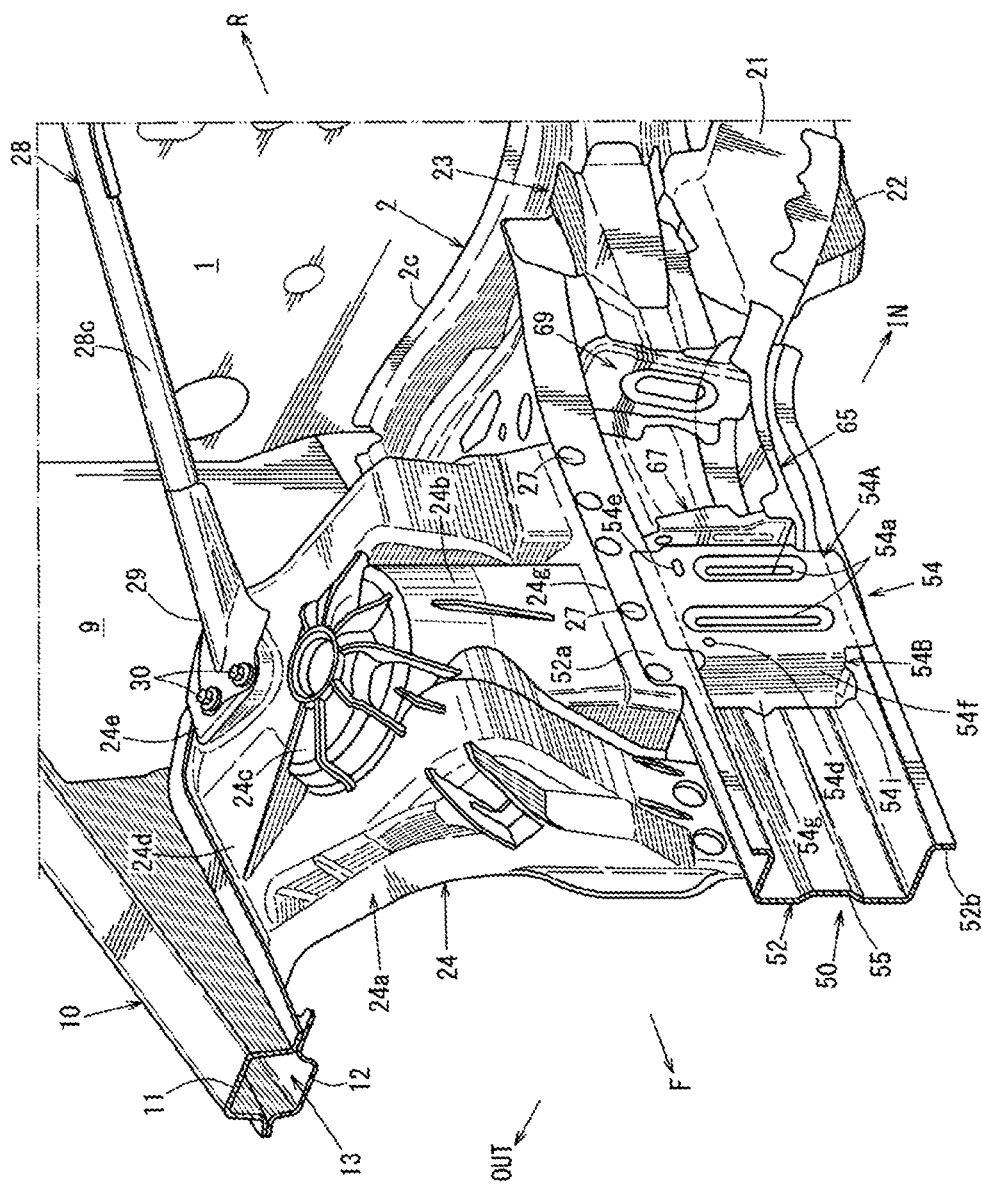
FIG. 11 is a main-part perspective view of FIG. 10.
Figure 12:
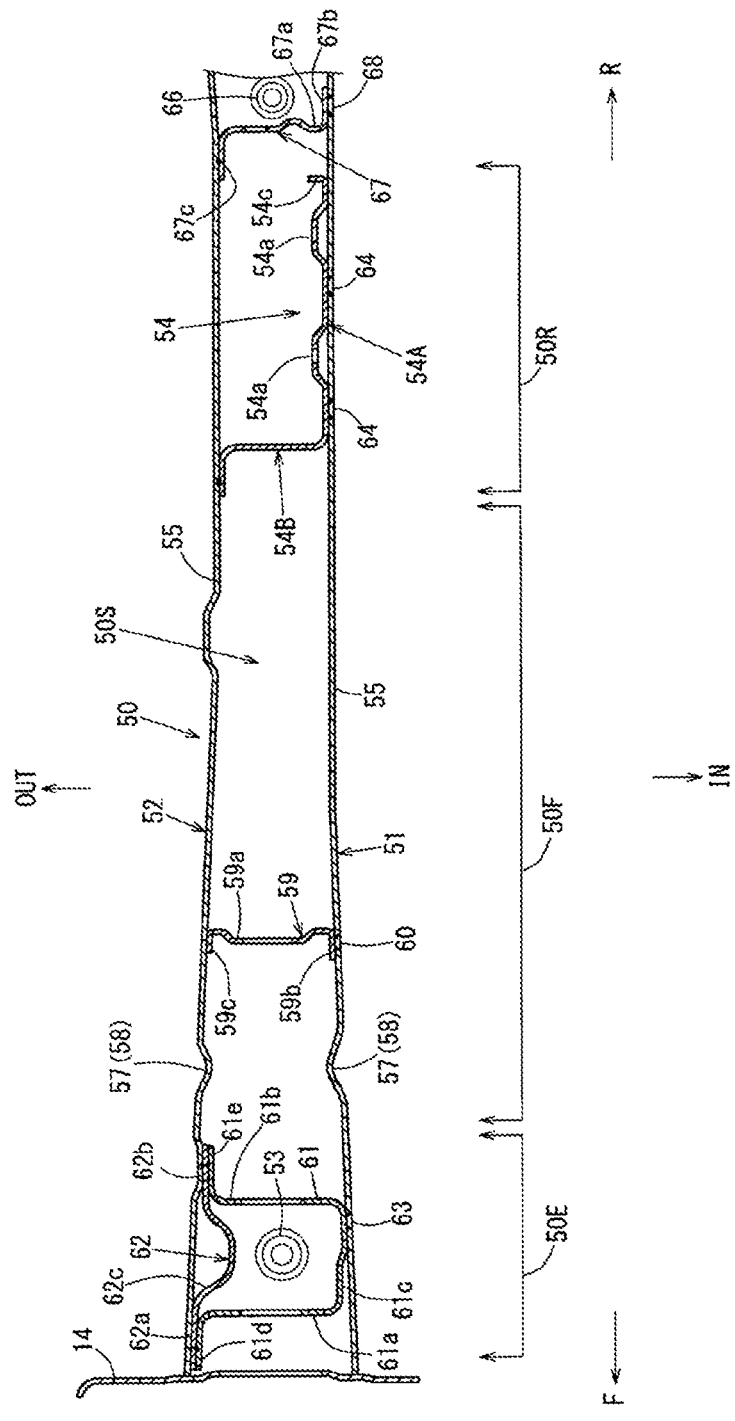
FIG. 12 is a main-part enlarged cross-sectional view taken along line D-D in FIG. 10.
Figure 13:
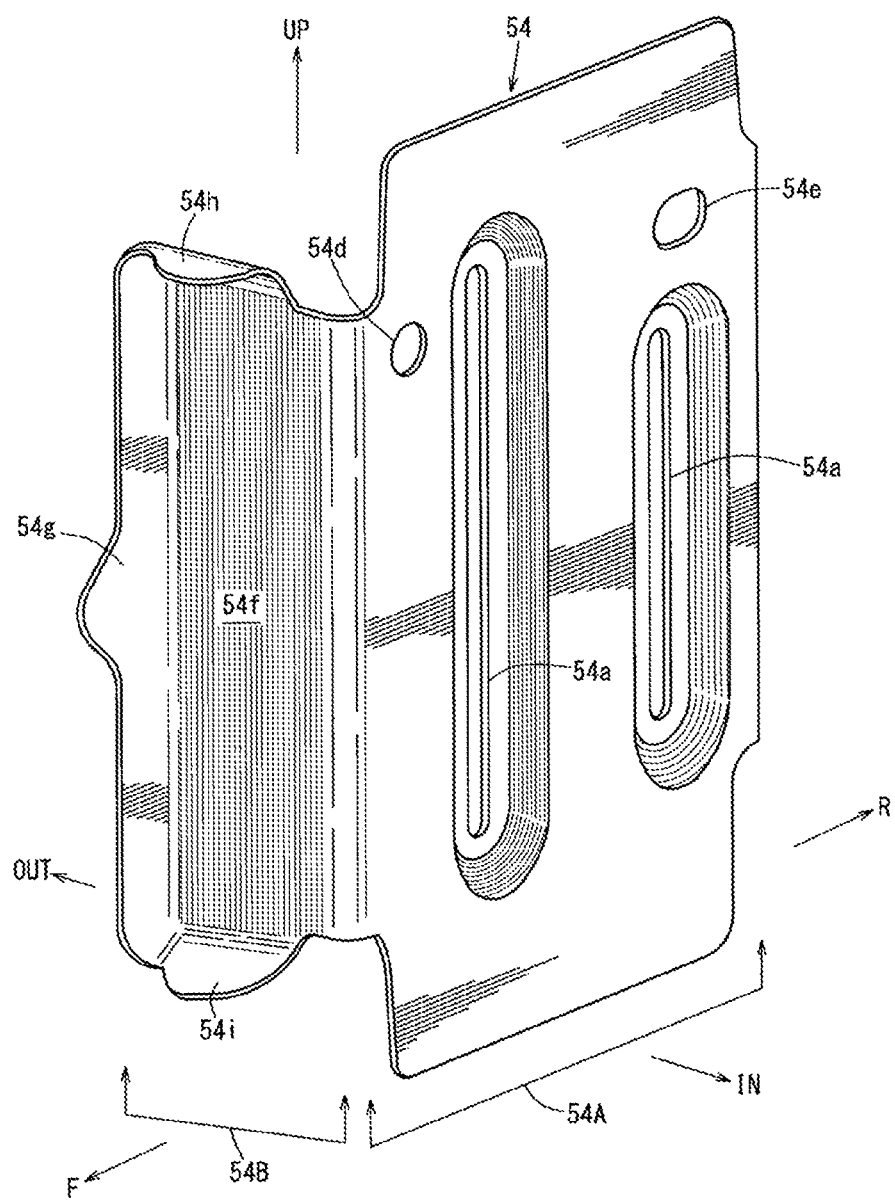
FIG. 13 is a perspective view illustrating the other embodiment of a reinforcement.

FIG. 9 to FIG. 13 illustrate Embodiment 2 of a front vehicle-body structure of a vehicle. FIG. 9 is an outer side view illustrating Embodiment 2 of the front vehicle-body structure on the vehicle right side, and FIG. 10 is an inner side view illustrating Embodiment 2 of the front vehicle-body structure in a state in which the front-side-frame inner portion 51 is removed. FIG. 11 is a main-part perspective view of FIG. 10, FIG. 12 is a main-part enlarged cross-sectional view taken along line D-D in FIG. 10, FIG. 13 is a perspective view illustrating the other embodiment of the reinforcement 54.

In FIG. 9 to FIG. 13, the same parts as those in the previous drawing are denoted by the same reference characters and detailed description thereof is omitted. FIG. 9 to FIG. 13 illustrate the structure on the vehicle right side, but the structure on the vehicle left side is formed to be bilaterally symmetrical or substantially bilaterally symmetrical to that on the right side.

In Embodiment 1 illustrated in FIG. 1 to FIG. 8C, the reinforcement 54 in which a total of five fragile portions (openings 54a) are formed so as to be spaced apart from each other at a predetermined interval in the vehicle front-rear direction has been exemplified, but the reinforcement 54 in which a total of two fragile portions (openings 54a) are formed so as to be spaced apart from each other at a predetermined interval is employed in Embodiment 2 illustrated in FIG. 9 to FIG. 13.

As a result, the length of the reinforcement 54 of Embodiment 2 in the vehicle front-rear direction is relatively shorter than the length of the reinforcement 54 of Embodiment 1 in the vehicle front-rear direction, and the weight of the reinforcement 54 can be saved by the length.

In the reinforcement 54 of Embodiment 2, the up-down-direction cross-sectional structure of a section in which the openings 54a are formed is the same as that of FIG. 5B, and the up-down-direction cross-sectional structure of a section in which the openings 54a are not formed is the same as that of FIG. 5A.

As illustrated in FIG. 12 and FIG. 13, the reinforcement 54 includes the reinforcement body 54A in which the plurality of openings 54a and the plurality of positioning openings 54d and 54e are formed, and a folded portion 54B integrally formed by being bent from a front end of the reinforcement body 54A to the vehicle-width-direction outer side.

As illustrated in FIG. 13, the folded portion MB includes a front wall portion 54f extending from the front end of the reinforcement body MA to the vehicle-width-direction outer side, a side flange 54g extending from a vehicle-width-direction outer end of the front wall portion 54f to the front side, and an upper flange 54h and a lower flange 54i extending from an upper end and a lower end of the front wall portion 54f to the front side.

As illustrated in FIG. 11 and FIG. 12, the side flange 54g of the folded portion MB is joined and fixed to the recessed bottom surface in the recessed front-rear bead portion 55 of the front-side-frame outer portion 52 by spot welding means. The upper and lower flanges 54h and 54i of the folded portion 54B are joined and fixed to upper and lower inner surfaces of the front-side-frame outer portion 52 by spot welding means.

As already described with reference to FIG. 5A, the reinforcement body 54A is joined and fixed to the recessed bottom surface in the recessed front-rear bead portion 55 of the front-side-frame inner portion 51 with use of the plurality of openings 64 for arc welding.

As described above, by joining the reinforcement 54 to one of the recessed front-rear bead portions 55 and the other of the recessed front-rear bead portions 55, sectional collapse of the front side frame 50 caused by a load input from the suspension tower portion 24 in the up-down direction is suppressed. Embodiment 2 illustrated in FIG. 9 to FIG. 13 also exhibits actions and effects substantially similar to those of Embodiment 1 illustrated in FIG. 1 to FIG. 8C regarding other features.

Regarding the correspondence between the configuration of the present disclosure and the abovementioned embodiments, the joint member of the present disclosure corresponds to the front portion joint member 59 of the embodiments. Similarly, the front subframe mounting portion corresponds to the weld nut 53 and the fragile portion corresponds to the opening 54a. However, the present disclosure is not limited to the configuration of the abovementioned embodiments.

As described above, the present disclosure is useful for a front vehicle-body structure of a vehicle including a pair of left and right front side frames extending in the vehicle front-rear direction.

What is claimed is:

1. A front vehicle-body structure of a vehicle, the front vehicle-body structure comprising:
a pair of left and right front side frames extending in a vehicle front-rear direction, each of the front side frames having a closed cross-section shape when seen from the vehicle front-rear direction and is configured such that a rear side portion has a higher rigidity than a front side portion, wherein
the front side frame includes an outer wall surface portion and an inner wall surface portion;
a recessed front-rear bead portion extending in the vehicle front-rear direction is included in each of the outer wall surface portion and the inner wall surface portion of the front side frame;
an up-down-width enlarged portion, in which an up-down width of the recessed front-rear bead portion is enlarged, is in a position in the front side portion of the front side frame that is close to a front side;
the up-down-width enlarged portion includes a low rigidity portion in which a recessed up-down bead portion, which is recessed to an inner side of the front side frame more than the recessed front-rear bead portion and which extends in an up-down direction, is configured, the low rigidity portion having a lowest rigidity in the regions of the front side portion and the rear side portion of the front side frame; and
rigidity differences are alternately configured in the vehicle front-rear direction in each of regions of the front side portion and the rear side portion.

2. The front vehicle-body structure of the vehicle according to claim 1, wherein
a joint member is disposed in the front side frame at a position directly behind the recessed up-down bead portion or the up-down-width enlarged portion.

3. The front vehicle-body structure of the vehicle according to claim 2, wherein:
a front subframe mounting portion is provided on a front end of the front side frame positioned on a vehicle front side of the front side portion of the front side frame; and
the recessed up-down bead portion or the up-down-width enlarged portion is provided directly behind the front subframe mounting portion.

4. The front vehicle-body structure of the vehicle according to claim 3, wherein
a reinforcement extending in the vehicle front-rear direction and joined to the rear side portion is included in the rear side portion of the front side frame.

5. The front vehicle-body structure of the vehicle according to claim 4, wherein
fragile portions are configured in the reinforcement so as to be spaced apart from each other at a predetermined interval in the vehicle front-rear direction.

6. The front vehicle-body structure of the vehicle according to claim 1, wherein
a reinforcement extending in the vehicle front-rear direction and joined to the rear side portion is included in the rear side portion of the front side frame.

7. The front vehicle-body structure of the vehicle according to claim 1, wherein:
a front subframe mounting portion is provided on a front end of the front side frame positioned on a vehicle front side of the front side portion of the front side frame; and
the recessed up-down bead portion or the up-down-width enlarged portion is provided directly behind the front subframe mounting portion.

8. The front vehicle-body structure of the vehicle according to claim 6, wherein fragile portions are configured in the reinforcement so as to be spaced apart from each other at a predetermined interval in the vehicle front-rear direction.

9. The front vehicle-body structure of the vehicle according to claim 7, wherein
a reinforcement extending in the vehicle front-rear direction and joined to the rear side portion is included in the rear side portion of the front side frame.

10. The front vehicle-body structure of the vehicle according to claim 9, wherein
fragile portions are configured in the reinforcement so as to be spaced apart from each other at a predetermined interval in the vehicle front-rear direction.

\* \* \* \* \*